Patented Oct. 22, 1946

2,409,930

UNITED STATES PATENT OFFICE 2,409,930

TREATMENT OF PRIMARY OLEORESIN ACIDS

Richard F. B. Cox, Wilmington, Del., assignor to Hercules Powder Company, Wilmington, Del., a corporation of Delaware No Drawing. Application February 16, 1943, Serial No. 476,091

9 Claims. (Cl. 260—101)

This invention relates to treatment of oleoresin acids. More particularly it relates to a method of preparing valuable acidic compositions from oleoresin acids and to a new acid composition obtained thereby.

In accordance with this invention, pine oleoresin, or a mixture of the acids found in pine oleoresin, is subjected while in solution in a paraffin or cycloparaffin hydrocarbon solvent to reaction with maleic anhydride at a temperature between 0 and 80° C. There is formed by this procedure an adduct of maleic anhydride and levo-pimaric acid which precipitates completely in crystalline form from the solution. The precipitate is removed from the resulting solution, whereby there is obtained a substantially pure crystalline tribasic acid useful for the preparation of esters and resins.

The residual solution comprises a dissolved resin acid product which has valuable and improved properties in use. Excess maleic anhydride may be removed therefrom and the dissolved product may be recovered from the solution. This product is substantially free from maleic anhydride and appears to be substantially free from compounds thereof. It is acidic in nature, remarkably resistant to oxidation, and is capable of esterification with polyhydric alcohols to form resins having melting points and stability considerably in excess of similar resinous esters of oleoresin or gum rosin. The product may be resinous or crystalline depending upon the initial oleoresin acids treated.

The method and product of this invention are illustrated in the following specific examples thereof:

Example 1

One hundred sixty-four parts of noncrystalline oleoresin containing 42.5% of rosin acids (equivalent to 0.23 mols of rosin acid) were dissolved in 305 parts of hexane, and the mixture was filtered and dried by agitation with anhydrous sodium sulfate. Thirty parts of powdered maleic anhydride (equivalent to 0.31 mol) were then added while the mixture was agitated and its temperature held at 55° C. After 8 hours at 55° C., the addition reaction between the resin acids and the maleic anhydride was complete. The reaction product crystallized out of the solution during the reaction. The solution was then cooled to 15° C. and the crystalline addition product removed by filtration and washed with hexane. By this procedure, 20 parts of white crystalline addition product (levo-pimaric acid-maleic anhydride adduct) having an acid number of 410 as determined by the pyridine method were obtained. The residual reaction mixture was then washed with water until free of maleic anhydride, and the hexane, terpenes, etc., removed by vacuum distillation to provide 60 parts of a noncrystallizing resin having an acid number of 156, a softening point of 84° C. and a color of WW (U. S. Rosin Color Standards).

Example 2

Three hundred parts of dry recrystallized oleoresin crystalline acids were dissolved in 1000 parts of hexane, and 60 parts of pulverized maleic anhydride were then added slowly in six portions so that the temperature of the hexane solution was readily maintained below 50° C. During this period, the maleic anhydride adduct formed crystallized out of the solution. After the addition of the maleic anhydride had been completed, stirring was continued for 16 hours, after which the adduct was filtered off, washed with water, and recrystallized first from aqueous acetone and then from ether. One hundred fifty parts of crystalline reaction product (levo-pimaric acid-maleic anhydride adduct) having an acid number of 413 by the pyridine method and a melting point of 227–229° C. was produced.

The hexane solution resulting from the separation of the crystalline adduct was washed with water. The hexane was then distilled off leaving a residual resin acid material. This material was recrystallized first from hexane and then from acetone, resulting in a yield in the crystalline form of approximately one half of the nonvolatile material in the residual hexane solution. The crystalline resin acid product so obtained had a melting point (capillary method) of 190–200° C. and a specific rotation of +38.7° when measured in 2% solution in alcohol. The crystalline resin acid product was found to be more resistant to oxidation than acids normally crystallized from rosin or oleoresin. It was also found to yield esters of unusually high melting point and resistance to oxygen. An ester prepared by heating 100 parts of the crystalline resin acid with 11.5 parts by weight of glycerin at 285° C. for 14 hours, followed by a 1-hour sparge at 280° C. with carbon dioxide, had a drop melting point of 119° C., an acid number of 1.5 and a Lovibond color of 20 Amber.

Example 3

Two hundred parts of crystalline oleoresin acids filtered from crude oleoresin were dissolved in 750 parts of hexane and the solution obtained was then dried with sodium sulfate and filtered. This solution was stirred at 30° C. with 50 parts of powdered maleic anhydride for 20 hours. During this period, crystals of levo-pimaric acid-maleic anhydride adduct separated. After filtering out and washing the crystals with hexane, 96.2 parts of the crystalline adduct, contaminated with traces of maleic anhydride, were obtained. The adduct was purified by stirring with hot water and filtering, to yield a product having an acid number of 415.

The solution from which the adduct was removed was washed with water and then with 100 parts of a 7% aqueous sodium bicarbonate solution to remove any residual maleic anhydride or maleic anhydride adduct. The solvent present was removed by heating the solution to 140° C., the last traces of solvent being removed by vacuum distillation. Ninety-five parts of resinous residue having a color of X (U. S. Rosin Color Standards), a drop melting point of 95–96° C., and an acid number of 182 were produced. Upon esterification of this resinous residue with glycerin in the manner described in Example 2 there was obtained an ester gum having a drop melting point of 117–118° C., an acid number of 3.3, and a Lovibond color of 10 Amber.

Example 4

One hundred parts of pine oleoresin, containing about 65% of resin acids and associated resinous material and about 35% of turpentine, were dissolved in 200 parts of gasoline, and the mixture filtered to remove dirt and leaves. The filtered solution was then stirred while 7.5 parts of maleic anhydride were added. The temperature rose to 40° C. during this addition process. After 3 hours, the temperature had dropped to 30° C. and the solution was cooled to 0° C. and filtered to remove the crystalline precipitate formed by the treatment. The crystalline material which was removed was stirred with hot water, filtered, and then washed with gasoline to produce a high yield of the levo-pimaric acid-maleic anhydride addition product having an acid number of 416 by the pyridine method.

The rosin solution from which the adduct was removed was washed with water and then with a 5% solution of aqueous sodium bicarbonate, to remove traces of maleic anhydride. The solvent and turpentine were then distilled off to obtain a resin having a color of WW, an acid number of 168, and a drop melting point of 84–85° C.

Example 5

Seventy-five parts of crystalline oleoresin acids which had been filtered out of partially crystalline oleoresin were dissolved with stirring in 175 parts of hexane. Trash, leaves, and the like were removed by filtering the solution. The hexane solution was dried by stirring with anhydrous sodium sulfate and then transferred to a reaction vessel fitted with cooling coils where 18 parts of powdered maleic anhydride were added with stirring. After stirring at 40–45° C. for an hour, the temperature was lowered to 25° C. The hexane solution was separated from levo-pimaric acid-maleic anhydride adduct crystals formed in the reaction by filtration, after which the crystalline adduct was purified by crystallization from solution in acetone. The crude crystalline adduct melted above 225° C.; purified, it melted at 227–229° C. and had an acid number of 415 by the pyridine method.

The residual hexane solution was washed with water to remove maleic anhydride and then with 5% aqueous sodium bicarbonate to remove any dissolved adduct. The hexane was then removed to produce a high melting rosin having a drop melting point of 90–92° C., a color of WW and an acid number of 178–180.

Example 6

One hundred parts of pine oleoresin, containing about 65% of resin acids and associated resinous material and about 35% of turpentine, were warmed to 40° C. and thoroughly mixed with 15 parts of powdered maleic anhydride which was added slowly to the oleoresin. After thorough dispersion of the maleic anhydride the mixture was permitted to stand for 3 hours. Two hundred parts of hexane at 20° C. were then thoroughly mixed with the oleoresin. The hexane dissolved the oleoresin and at the same time brought about the formation of a crystalline precipitate of the maleic anhydride adduct of levo-pimaric acid. The crystalline material was filtered from the solution, thoroughly washed with warm water and dried. The crystalline adduct so obtained had an acid number of 415 by the pyridine method.

The residual hexane solution was washed with water and then with an aqueous 5% solution of sodium bicarbonate to remove residual maleic anhydride and any residual maleic anhydride compounds. The hexane and turpentine present were then distilled off to leave a resinous product having a color of WW, an acid number of 166, and a drop melting point of 85° C.

The above examples illustrate the method of this invention for preparing high yields of the substantially pure crystalline addition product of levo-pimaric acid and maleic anhydride. In the examples, the addition reaction was conducted at 30–50° C. Temperatures between about 25° C. and about 60° C. are preferred. However, this reaction may be conducted at any temperature within the range from about 0° C. to 80° C. Below 0° C. the reaction is too slow to be practicable. At above 80° C. isomerization materially alters the oleoresin acid, changing the character of the residual resin acid material remaining in the reaction solution.

The time required for the addition reaction may vary within wide limits and will depend upon such factors as the particular oleoresin or oleoresin acid mixture employed, upon the relative proportions of oleoresin acid and maleic anhydride, upon the reaction temperature, upon the solvent used, and upon other factors. Usually, the reaction time will vary within the range from about ½ to about 24 hours, about 5 hours being sufficient in the majority of cases.

In the examples the reaction was carried out using hexane or gasoline as the solvent medium. However, any volatile paraffinic or cycloparaffinic hydrocarbon solvent has been found to be suitable. Thus, for example, liquefied butane, pentane, heptane, octane, decane, petroleum naphthas of the paraffinic or cycloparaffinic type, gasoline, kerosene, cyclopentane, cyclohexane, methyl cyclohexane, ethyl cyclohexane, decahydronaphthalene, pinane, and the like, are suitable. These solvents are characterized by their ability to dissolve oleoresin and primary oleoresin acids while being substantially non-solvent for the maleic anhydride adduct of levo-pimaric acid. Solvents of this character having a boiling point or boiling range between about 0° C. and about 400° C. are suitable; preferably the boiling point or range is between about 60° C. and about 130° C.

It will be appreciated that oleoresin contains a substantial proportion of turpentine. Although turpentine will not function in the manner of the solvents utilized in accordance with the method of this invention, the quantity found in oleoresin can be tolerated in that upon dilution with an amount of hexane to give a solution of about 60% or more of volatile solvents, there is formed a solution capable of precipitating the desired adduct very nearly quantitatively. However, it is preferred to operate in the absence of solvents, such as turpentine, tending to dissolve the maleic anhydride adduct.

The oleoresin or primary oleoresin acid is dissolved in the solvent in such a quantity as to form a solution between about 5% and about 60% of non-volatile components. Preferably, the concentration of the non-volatile components is between about 30% and about 50%. After the solution has been formed, it is desirable to filter it to remove any bark, leaves, or other trash found in the oleoresin. It is also desirable to remove any water present either by decantation or by drying by treatment with a water-absorbent material such as anhydrous sodium sulfate or by subjecting the solution to both procedures. Utilization of anhydrous solution is desirable so as to prevent the formation of maleic acid from maleic anhydride.

The quantity of maleic anhydride added to the oleoresin acid solution depends upon the content of the levo-pimaric acid of the solution. Preferably, the maleic anhydride is stoichiometrically equivalent to the levo-pimaric acid present on a basis of 1 mol of maleic anhydride to 1 mol of levo-pimaric acid or in a slight excess such as 10% thereover. In general, depending on the levo-pimaric acid content of the oleoresin or oleoresin acids in the solution, a quantity between about 0.1 and about 1.5 mols of maleic anhydride per mol of total resin acid present will be utilized.

The method according to this invention may be applied to oleoresin, gum dip, oleoresin from which a portion or substantially all of the volatile materials have been removed without substantial isomerization of the levo-pimaric acid content, or it may be applied to primary resin acids separated as by crystallization from the oleoresin. Such primary acids may be separated by filtration from partially crystallized oleoresin. They may also be formed by crystallization from solvent solutions of the oleoresin in the manner described in the Palkin and Harris patent, U. S. 2,086,777. It is essential, however, that the oleoresin or oleoresin acids separated therefrom be treated only in a manner which permits retention of the primary oleoresin acids, i. e., which does not cause material isomerization of the primary acids. Since the method in accordance with this invention provides relatively high yields of pure maleic anhydride adduct by reaction of the maleic anhydride essentially with levo-pimaric acid, it is essential in obtaining these high yields that the levo-pimaric acid present in the initial oleoresin be retained in that form until reacted with the maleic anhydride. In any case, no more than 60% of the primary oleoresin acids should be isomerized before use in the process of this invention.

The reaction of the maleic anhydride in the oleoresin acid solution leads to the formation of an adduct with levo-pimaric acid and, so far as is known, only with levo-pimaric acid. The adduct apparently is formed in the substantially pure crystalline form which precipitates immediately in the solution. The separation of the adduct is substantially quantitative, very little, if any, maleic anhydride adduct of levo-pimaric or other acids remaining in the solution.

The crystals of the adduct are readily separated from the solution by means such as centrifuging or filtration. They may be purified by washing with hexane or one of the other solvents for oleoresin acids hereinabove-mentioned. It is usually desirable to wash the adduct crystals with water, in which they are insoluble, in order to remove any traces of unreacted maleic anhydride which may be present. Upon drying of the washed crystals there is obtained a very pure white or pale amber crystalline tribasic acid useful for the preparation of monohydric alcohol esters, polyhydric alcohol esters and complex resins by reaction with polyhydric alcohols and fatty oil acids or other modifiers. The crystalline adduct product in its pure form will be distinguished by an acid number of between about 400 and about 420. Even in a relatively crude form, the crystalline adduct will have an acid number above 380.

An alternative to the procedure of dissolving the oleoresin in the solvent and then adding maleic anhydride resides in a modification within the scope of the present invention in which oleoresin, preferably warmed to 40–60° C., is mixed with maleic anhydride and then mixed with the solvent. The maleic anhydride may be in powder form or dispersed or dissolved in a small quantity of solvent therefor. It is believed relatively little reaction takes place until an appreciable amount of solvent is present. However, upon addition of the solvent the oleoresinous material dissolves in the solvent and at the same time there are formed crystals of the maleic anhydride adduct which are then readily separated.

After separation of the maleic anhydride adduct from the solution, the residual solution is desirably washed with water to remove residual maleic anhydride. Alternatively or additionally, a wash with water containing a small amount of an alkali, for example, 1–20% of an alkaline alkali metal compound, such as sodium bicarbonate, potassium bicarbonate, sodium carbonate, and the like, is given the residual solution to remove both any maleic anhydride residue and any maleic anhydride adduct compound which may be present.

Volatile solvents such as hexane and the turpentine solvents in the original oleoresin may then be removed by distillation, preferably vacuum distillation, to leave an acidic resin acid composition. Where the starting material is whole oleoresin or a relatively crude crystalline fraction thereof, the residual acid composition will be resinous in nature. Where crystalline primary acids removed from oleoresin are used as the starting material, the residual acid material will in most cases be crystalline. A crystalline acid residual composition may be obtained either by dissolving the resinous residual composition and crystallizing an acid product therefrom or by separating crystals forming upon evaporation of the solvent at low temperatures. This procedure is aided by seeding.

The residual acid product is substantially free of maleic anhydride and is believed to be substantially free of maleic anhydride addition products. Its acid number will be between 150 and 186, depending on the original material reacted upon. The melting point will in all cases be above about 84° C. Where the residual acid product is crystalline it will have a melting point by the capillary method of 180–210° C., usually 190–200° C., and an acid number between about 180 and 186. The residual acid product is characterized by a very high resistance to oxidation as compared with rosin and crystalline rosin acids of corresponding physical form. In addition, this stability is contributed to esters prepared therefrom. Esters such as the glycerol ester are characterized by a relatively high melting point as compared with similar esters prepared from gum rosin obtainable from the same oleoresin.

The method in accordance with this invention operates to remove levo-pimaric acid quantitatively from the oleoresin or oleoresin acid mixture reacted on, it being merely necessary to add at least an equivalent of maleic anhydride. In this manner a relatively high yield of pure, fully reacted maleic anhydride adduct is obtained in a very simple manner. The residue contains substantially all of the non-acid components of the oleoresin reacted upon. However, unexpectedly, this residue is more resistant to oxidation and capable of furnishing esters which are more resistant to oxidation, and which have a higher melting point than esters prepared from the oleoresin material without removal of the levo-pimaric acid. The relatively high melting point of the esters is illustrated in Examples 2 and 3. The residual acid product may be esterified, polymerized, hydrogenated, and otherwise utilized as a rosin product, having the advantages over rosin in stability and melting point, which have been mentioned. The residue may also be reacted with maleic anhydride to furnish additional maleic anhydride-rosin acid adduct if temperatures above 80° C. are used for the reaction.

Where the term "melting point" is used herein and in the claims it will be understood that melting point by the drop method is meant for products which are of a resinous or vitreous nature, and that melting point by the capillary method will be meant where the products are of a crystalline nature. In referring to acid number by the pyridine method it will be understood that the acid number includes the acidity due to free carboxyl groups and also the acidity corresponding to carboxyl groups in the acid anhydride form. The pyridine method consists in refluxing for 1 hour 1.5–2 grams of sample with 25 cubic centimeters of pyridine and exactly 30 cubic centimeters of standardized normal aqueous sodium hydroxide in a 250 cubic centimeter Erlenmeyer flask fitted with a reflux condenser, then rinsing the condenser into the flask and titrating the flask with standardized half-normal hydrochloric acid using phenolphthalein as indicator. This procedure is repeated, omitting the sample being tested, to obtain a blank determination. The acid number is calculated by multiplying the difference in the number of cubic centimeters utilized in the blank determination and in the sample determination by the normality factor of the hydrochloric acid solution and by 56.1, and then dividing by the weight of the sample in grams.

What I claim and desire to protect by Letters Patent is:

1. A method for the preparation of acidic compositions which comprises subjecting a material consisting substantially entirely of primary oleoresin acids containing levopimaric acid, in solution in a volatile solvent selected from the group consisting of paraffin hydrocarbons and cycloparaffin hydrocarbons, to reaction with maleic anhydride at a temperature between about 0° C. and 80° C., to cause the formation of a precipitated crystalline maleic anhydride-resin acid adduct, separating the crystalline precipitate from the solution, extracting the solution with dilute aqueous alkali to remove any residual maleic anhydride and compounds thereof, and recovering a resinous material from the residual solution.

2. A method for the preparation of acidic compositions which comprises subjecting a material consisting substantially entirely of primary oleoresin acids containing levo-pimaric acid, in solution in a volatile solvent selected from the group consisting of paraffin hydrocarbons and cycloparaffin hydrocarbons, to reaction with maleic anhydride at a temperature between about 0° C. and 80° C., to cause the formation of a precipitated crystalline maleic anhydride-resin acid adduct, and separating the crystalline precipitate from the resulting solution of residual acidic composition.

3. A method for the preparation of acidic compositions which comprises subjecting a material consisting substantially entirely of a mixture of primary oleoresin acids containing levo-pimaric acid, said material having been separated by crystallization from pine oleoresin, in solution in a volatile solvent selected from the group consisting of paraffin hydrocarbons and cycloparaffin hydrocarbons, to reaction with maleic anhydride at a temperature between about 0° C. and 80° C., to cause the formation of a precipitated crystalline maleic anhydride-resin acid adduct, separating the crystalline precipitate from the resulting solution of residual acidic composition, and recovering a crystalline rosin acid fraction from the residual solution.

4. A method for the preparation of acidic compositions which comprises subjecting a material consisting substantially entirely of a mixture of primary oleoresin acids containing levo-pimaric acid, in solution in a volatile paraffin hydrocarbon solvent, to reaction with maleic anhydride at a temperature between about 0° C. and 80° C., to cause the formation of a precipitated crystalline maleic anhydride-resin acid adduct, and separating the crystalline precipitate from the resulting solution of residual acidic composition.

5. A method for the preparation of acidic compositions which comprises subjecting a material consisting substantially entirely of a mixture of primary oleoresin acids containing levo-pimaric acid, in solution in hexane, to reaction with maleic anhydride at a temperature between about 0° C. and 80° C., to cause the formation of a precipitated crystalline maleic anhydride-resin acid adduct, and separating the crystalline precipitate from the resulting solution of residual acidic composition.

6. A method for the preparation of acidic compositions which comprises subjecting a material consisting substantially entirely of a mixture of primary oleoresin acids containing levo-pimaric acid, in solution in a substantially saturated petroleum naphtha, to reaction with maleic anhydride at a temperature between about 0° C. and 80° C., to cause the formation of a precipitated crystalline maleic anhydride-resin acid adduct, and separating the crystalline precipitate from the resulting solution of residual acidic composition.

7. A method for the preparation of acidic compositions which comprises subjecting a material consisting substantially entirely of a mixture of primary oleoresin acids containing levo-pimaric acid, in solution in a volatile paraffin hydrocarbon solvent, to reaction with maleic anhydride at a temperature between about 0° C. and 80° C. to cause the formation of a precipitated crystalline maleic anhydride-resin acid adduct, separating the crystalline precipitate from the solution and recovering a rosin acid fraction from the residual solution.

8. A method for the preparation of acidic compositions which comprises subjecting a material consisting substantially entirely of a mixture of primary oleoresin acids containing levo-pimaric acid, in solution in hexane, to reaction with maleic anhydride at a temperature between about 0° C. and 80° C., to cause the formation of a precipitated crystalline maleic anhydride-resin acid adduct, separating the crystalline precipitate from the solution, and recovering a rosin acid fraction from the residual solution.

9. A method for the preparation of acidic compositions which comprises subjecting a material consisting substantially entirely of primary oleoresin acids containing levo-pimaric acid, in solution in a substantially saturated petroleum naphtha, to reaction with maleic anhydride at a temperature between about 0° C. and 80° C., to cause the formation of a precipitated crystalline maleic anhydride-resin acid adduct, separating the crystalline precipitate from the solution and recovering a rosin acid fraction from the residual solution.

RICHARD F. B. COX.